(12) United States Patent
Li

(10) Patent No.: US 9,885,823 B2
(45) Date of Patent: Feb. 6, 2018

(54) BACKLIGHT MODULE AND LIQUID CRYSTAL DISPLAY DEVICE COMPRISING THE BACKLIGHT MODULE

(71) Applicant: Shenzhen China Star Optoelectronics Technology Co. Ltd., Shenzhen, Guangdong (CN)

(72) Inventor: Dehua Li, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/778,243

(22) PCT Filed: Jun. 25, 2015

(86) PCT No.: PCT/CN2015/082280
§ 371 (c)(1),
(2) Date: Dec. 11, 2015

(87) PCT Pub. No.: WO2016/201713
PCT Pub. Date: Dec. 22, 2016

(65) Prior Publication Data
US 2017/0146725 A1  May 25, 2017

(30) Foreign Application Priority Data
Jun. 18, 2015 (CN) .......................... 2015 1 0338171

(51) Int. Cl.
*F21V 8/00* (2006.01)
*F21V 14/04* (2006.01)

(52) U.S. Cl.
CPC ............ *G02B 6/0088* (2013.01); *F21V 14/04* (2013.01); *G02B 6/0055* (2013.01); *G02B 6/005* (2013.01); *G02B 6/0063* (2013.01)

(58) Field of Classification Search
CPC .................. G09F 11/15; G09F 11/12; G02F 2001/133626–2001/133627;
(Continued)

(56) References Cited

U.S. PATENT DOCUMENTS 5,856,819 A * 1/1999 Vossler ..................... G09F 9/35
345/102

FOREIGN PATENT DOCUMENTS

| CN | 1797104 A | * | 7/2006 |
| CN | 101105600 A | * | 1/2008 |

OTHER PUBLICATIONS

Zhang (CN1797104 A) translation, Translated on Espacenet, patent date: Jul. 2006, China, Translated on May 2, 2017.*
(Continued)

*Primary Examiner* — Diane Lee
*Assistant Examiner* — Michael Nadeau
(74) *Attorney, Agent, or Firm* — Kim Winston LLP

(57) ABSTRACT

Disclosed is a backlight module and a liquid crystal display device including the backlight module. The backlight module includes a rear plate, a light guide plate, an optical film, a reflection sheet, and a position transformation mechanism. The position transformation mechanism is used to interchange the positions of the optical film and the reflection sheet, so that the optical film is located at one of a front surface and a back surface of the light guide plate, and the reflection sheet is located at the other one of the front surface and the back surface of the light guide plate. The backlight module broadens the application scope of liquid crystal display devices, thus providing users with more human-oriented services.

14 Claims, 3 Drawing Sheets

(58) Field of Classification Search
CPC ..... G02F 2001/133314; G02F 2203/62; G02F 1/133605–1/133608; G02F 1/133615; G02B 6/0088; G02B 6/0055
USPC ..... 198/371.3, 804, 823, 824; 362/616, 812; 349/67; 345/108, 110
See application file for complete search history.

(56) References Cited

OTHER PUBLICATIONS

Cai (CN101105600 A) translation, Translated on Espacenet, patent date: Jan. 2008, China, Translated on May 2, 2017.*

* cited by examiner

BACKLIGHT MODULE AND LIQUID CRYSTAL DISPLAY DEVICE COMPRISING THE BACKLIGHT MODULE

CROSS REFERENCE OF RELATED APPLICATIONS

The present application claims the priority of Chinese patent application CN201510338171.X, entitled "Backlight module and liquid crystal display device comprising the backlight module" and filed on Jun. 18, 2015, the entirety of which is incorporated herein by reference.

TECHNICAL FIELD

The present disclosure relates to the technical field of production of liquid crystal display devices, and in particular, to a backlight module and liquid crystal display device comprising the backlight module.

TECHNICAL BACKGROUND

As a very common display device, liquid crystal display devices have advantages over other display devices of low power consumption, small volume, light weight, and thin structure, and are being used in an increasingly wider range of fields. Currently, the capacity of providing users with more human-oriented services has become a distinguishing feature of liquid crystal display devices.

However, according to existing technologies, the properties of liquid crystal display devices are still relatively limited, and are not able to meet increasing requirements of users for diverse functions. Therefore, it is desired that a liquid crystal display device capable of furnishing users with more human-oriented functions be provided.

SUMMARY OF THE INVENTION

Directed by the above technical problems in the existing technologies, the present disclosure provides a backlight module and a liquid crystal display device comprising the backlight module. The backlight module can provide a light source not only for the liquid crystal glass of the liquid crystal display device, but also for daily lighting, thereby broadening the application scope of backlight modules, and meeting various requirements of users. The backlight module is simple in structure, and is easy to be manufactured.

According to one aspect of the present disclosure, a backlight module is provided. The backlight module is in the form of an edge-lit backlight module, and comprises a rear plate, a light guide plate arranged in the rear plate, an optical film, a reflection sheet, and a position transformation mechanism. The position transformation mechanism is used to interchange the positions of the optical film and the reflection sheet, so that the optical film is located at one of a front surface and a back surface of the light guide plate, and the reflection sheet is located at the other one of the front surface and the back surface of the light guide plate.

In one embodiment, the position transformation mechanism comprises a roller assembly connecting to the rear plate, and the two sides of the optical film and the two sides of the reflection sheet are respectively connected with each other permanently, so as to form a transmission sleeve which wraps around the transmission roller assembly.

In one embodiment, the roller assembly comprises a supporting element, a supporting shaft, and a bearing. The supporting element is arranged fixedly on the rear plate, and is provided with a round hole at an edge of a side thereof away from the light guide plate, and a groove in a direction perpendicular to an axial direction of the round hole. The supporting shaft is arranged in the round hole. The bearing is arranged in the groove, and is fixed on the supporting shaft.

In one embodiment, provided is a plurality of bearings. The number of the grooves equals to that of the bearings, and the width of the grooves matches that of the bearings.

In one embodiment, the bearings each are provided with a flexible material on a circumferential outer wall thereof.

In one embodiment, the transmission sleeve is provided with the roller assembly symmetrically on both sides thereof.

In one embodiment, the backlight module further comprises a light source provided on a light entering side of the light guide plate. The roller assembly and the light source are arranged away from the light guide plate in sequence. An adjusting wheel assembly for adjusting position of the transmission sleeve is provided at the side of the back surface of the light guide plate.

In one embodiment, the rear plate is structured as a frame, and a glass plate is provided between the rear plate and the light guide plate.

In one embodiment, a reflection shelf is arranged on a side of the back surface of the rear plate.

According to another aspect of the present disclosure, a liquid crystal display device comprising the above backlight module is provided.

Compared with the existing technologies, the present disclosure provides the following advantages. By adjusting the positions of the optical film and the reflection sheet upon different demands of users, the backlight module can provide not only a light source for the liquid crystal glass of the liquid crystal display device, but also light for general lighting by allowing the light generated by the light source to exit from the back of the backlight module. Therefore, the backlight module provided by the present disclosure broadens the application scope of liquid crystal display devices, and furnishes users with more human-oriented services. In addition, in the backlight module, positions of the optical film and the reflection sheet can be interchanged by means of the roller assembly, which is simple in structure, and is easy to be achieved.

BRIEF DESCRIPTION OF THE DRAWINGS

For further illustrating the technical solutions provided in the embodiments of the present disclosure, a brief introduction will be given below to the accompanying drawings involved in the embodiments.

DETAILED DESCRIPTION OF THE EMBODIMENTS

The present disclosure will be explained in detail with reference to the accompanying drawings.

Figure 1:
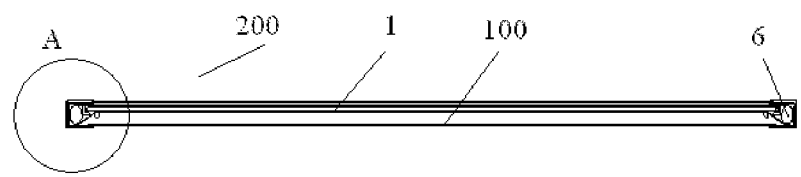
FIG. 1 shows a cross-section view of a liquid crystal display device according to embodiment 1 of the present disclosure.
Figure 2:
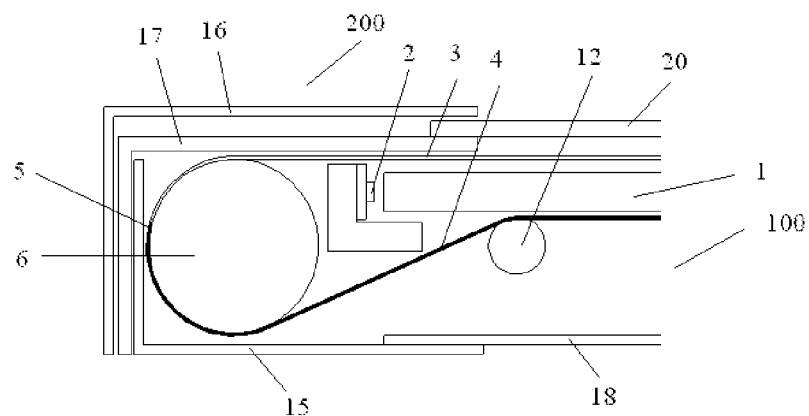
FIG. 2 shows an enlarged view of part A of FIG. 1.

FIG. 1 shows the structure of a liquid crystal display device 200. As shown in FIG. 1, the liquid crystal display device 200 comprises a backlight module 100. And as shown in FIG. 2, the backlight module 100 comprises a rear plate 15, a light guide plate 1, a light source 2, an optical film 3, a reflection sheet 4, and a position transformation mechanism 6. The backlight module 100 is in the form of an edge-lit backlight module, i.e., the light source 2 is arranged on a side of the light guide plate 1. The light guide plate 1 is provided in the rear plate 15. To enable light emitted by the light source 2 to irradiate effectively on a liquid crystal glass 20 of the liquid crystal display device 200, a front surface of the light guide plate 1 is covered with an optical film 3. And to improve the ratio of utilizing the light emitted by the light source 2, a back surface of the light guide plate is arranged a reflection sheet 4. According to the present disclosure, the position transformation mechanism 6 is used to interchange the positions of the optical film 3 and the reflection sheet 4, so that the optical film 3 is located at one of the front surface and the back surface of the light guide plate 1, and the reflection sheet 4 is located at the other one of the front surface and the back surface of the light guide plate 1.

It should be noted that the "front" surface and the "back" surface are referenced along with the practical orientation of the liquid crystal display device 200.

When the optical film 3 is located at the front surface of the light guide plate 1, and the reflection sheet 4 is located at the back surface of the light guide plate, the light emitted by the light source 2 and the light reflected by the reflection sheet 4 exit finally towards the front surface via the optical film 3, thereby providing effective light for the liquid crystal glass 20 of the liquid crystal display device 200. When the optical film 3 and the reflection sheet 4 interchange their positions, that is, when the optical film 3 is located at the back surface of the light guide plate 1 while the reflection sheet 4 is located at the front surface of the light guide plate, the light emitted by the light source 2 and the light reflected by the reflection sheet 4 exit finally towards the back surface via the optical film 3, thereby providing light for daily lighting rather than for the liquid crystal glass 20. Preferably, the light source 2 can be a light-emitting diode (LED). As a light source, LED has advantages of high light-emitting efficiency, low power consumption, and high color purity. Therefore, light emitted by LED is perfect for lighting, and can be used in daily life. Thus, the backlight module 100 can provide light not only for the liquid crystal glass 20 of the liquid crystal display device 200, but also for daily lighting, thereby widening the application scope of the backlight module 100, and making the display device be used for different purposes.

According to the present disclosure, the two sides of the optical film 3 and the two sides of the reflection sheet 4 are respectively connected with each other permanently to form a transmission sleeve 5, i.e., the optical film 3 and the reflection sheet 4 are connected end-to-end to form a transmission sleeve 5. The position transformation mechanism 6 comprises a roller assembly for driving the transmission sleeve 5, so as to achieve the interchange of positions of the optical film 3 and the reflection sheet 4.

Figure 7:
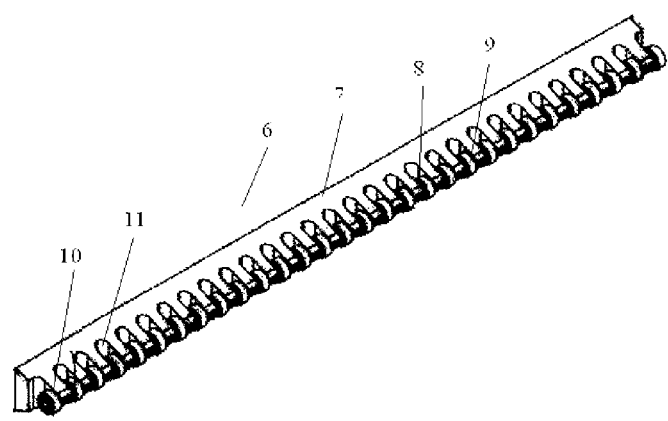
FIG. 7 shows a view of a structure of a roller assembly according to the present disclosure.

As shown in FIG. 7, the roller assembly comprises a supporting element 7, a supporting shaft 8, and a bearing 9. The supporting element 7 is shaped as a long strip, and the two ends thereof are connected permanently to the rear plate 15. The supporting element 7 is provided with a round hole 10 at an edge of a side thereof, and a groove 11 is formed in a direction perpendicular to an axial direction of the round hole 10. The supporting shaft 8 can be arranged in the round hole 10. The bearing 9 can be arranged in the groove 11, and is fixed on the supporting shaft 8. During operation, the transmission sleeve 5 moves around the roller assembly by coming into contact with the bearing 9. Preferably, a plurality of bearings 9 is provided. The number of the grooves 11 equals to that of the bearings 9, and the width of the grooves 11 matches that of the bearings 9. By means of such arrangement, the supporting shaft 8 can be considered as a plurality of shorter supporting shafts, thereby preventing the supporting shaft 8 from bending due to the large span thereof, and meanwhile, ensuring the stability of the optical film 3 and the reflection sheet 4 in the transmission process of interchanging positions.

In one embodiment, the bearings 9 each are provided with a flexible material on a circumferential outer wall thereof, and the flexible material is preferably rubber, resin, or expanded plastics. By such arrangement, when the bearing 9 and the transmission sleeve 5 come into contact with each other, the friction therebetween will be increased, thereby ensuring the transmission speed and distance of the transmission sleeve 5, so that positions of the optical film 3 and the reflection sheet 4 can be interchanged precisely. Besides, the flexible material provided on the outer wall of the bearing prevents the transmission sleeve 5 from being excessively abraded due to the direct contact between the bearing 9 and the transmission sleeve 5, so as to protect the optical film 3 and the reflection sheet 4.

Figure 3:
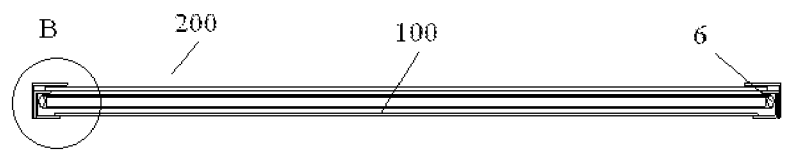
FIG. 3 shows a cross-section view of a liquid crystal display device according to embodiment 2 of the present disclosure.

To ensure stability of operation, the transmission sleeve 5 is provided symmetrically with the position transformation mechanisms 6 on both sides thereof, i.e., the light guide plate 1 is provided a pair of position transformation mechanisms 6 on both sides thereof. As shown in FIGS. 1 and 3, such arrangement renders the movement of the transmission sleeve 5 more steadily, and the interchange between the optical film 3 and the reflection sheet 4 more efficient.

In practical manufacturing process, the light source 2 may be located symmetrically on both sides of the light guide plate 1. In this case, as shown in FIGS. 1 and 2, the position transformation mechanisms 6 can be arranged on a same side as the light entering side of the light source 2, and the position transformation mechanisms 6 is far away from the light guide plate 1 relative to the light source 2. According to such arrangement, interference of the transmission sleeve 5 on the light source 2 can be prevented. Hence, an adjusting wheel assembly 12 can be arranged at the side of the back surface of the light guide plate 1, and is located close to the light entering side of the light guide plate 1, for adjusting position of the transmission sleeve 5 so that the transmission sleeve 5 is close to the light guide plate 1 and parallel to the back surface of the light guide plate 1. For simplicity, the adjusting wheel assembly 12 can be structured as a rotating part permanently connecting to the rear plate 15. However, for stability of movement, the adjusting wheel assembly 12 can be further structured with a structure being the same as that of the roller assembly. The specific structure of the adjusting wheel assembly 12 will not be described herein in detail.

Figure 4:
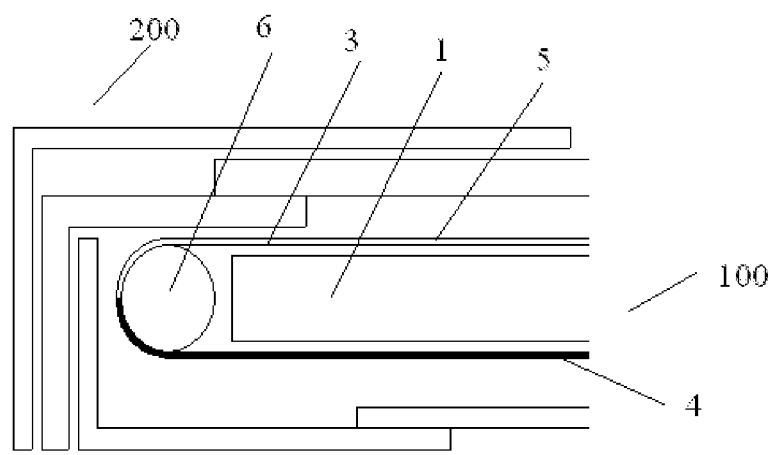
FIG. 4 shows an enlarged view of part B of FIG. 3.

As shown in FIGS. 3 and 4, in the case that the light source 2 is arranged symmetrically on both sides of the light guide plate 1, the position transformation mechanisms 6 can also be arranged on a side other than the light entering side of the light source 2. In this case, the transmission sleeve 5 would not intervene the light source 2, so that the adjusting wheel assembly 12 is no longer necessary, thereby simplifying the structure of the backlight module 100, and rendering the backlight module 100 thinner. However, in the manufacturing process, the light source 2 is usually located on the right and left sides, namely the shorter sides of the widescreen of the liquid crystal display device 200, rather than the upper and lower sides, namely the longer sides. Therefore, to arrange the position transformation mechanisms 6 on a side other than the light entering side of the backlight module 100 will increase the length of the supporting shaft 8, thereby increasing the manufacturing cost.

Figure 5:
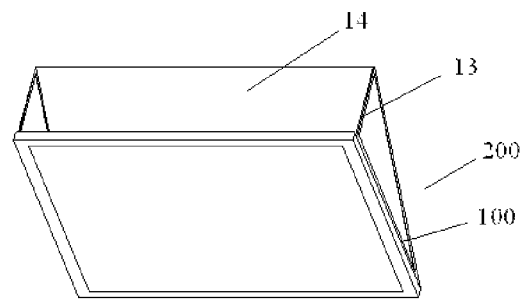
FIG. 5 shows a liquid crystal display device according to the present disclosure.
Figure 6:
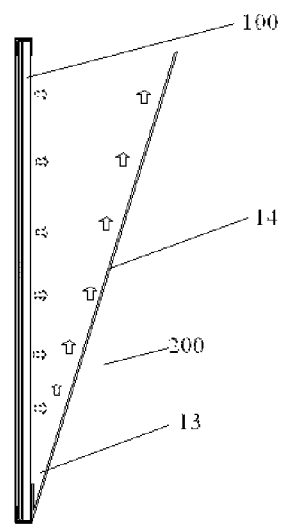
FIG. 6 shows a view of a light path of a reflection frame according to the present disclosure.

As shown in FIG. 5, the backlight module 100 further comprises a reflection shelf 13 arranged on a side of the back surface of the light guide plate 1. The reflection shelf 13 is connected permanently to the rear plate 15, and comprises a flat plate 14 which forms an angle relative to the plane of the rear plate 15. Thus, as shown in FIG. 6, after reaching the flat plate 14, the light emitted by the light source 2 is reflected by the flat plate 14, and then becomes light for lighting (as shown by the arrows). It should be noted that the angle formed between the flat plate 14 and the rear plate 15 could vary according to different demands for the light.

As shown in FIG. 2, to ensure that the light can transmit through the rear plate 15 and then reach the flat plate 14, the rear plate 15 is structured as a frame, and is provided with a light transmitting glass 18. The light transmitting glass 18 also functions to protect the elements arranged in front of the rear plate 15, such as the reflection sheet 4.

As shown in FIGS. 1 and 2, the liquid crystal display device 200 according to the present disclosure further comprises a liquid crystal glass 20 which is provided at the front surface of the backlight module 100, and is located between the front frame 16 and the plastic frame 17. These structures and components are well-known by those skilled in the art, and therefore will not be described herein in detail.

The above embodiments are merely preferred embodiments of the present disclosure, and are not used to restrict the present disclosure. Anyone skilled in the art can make amendments to the implementing forms or details without departing from the spirit and scope of the present disclosure. The scope of the present disclosure should still be subject to the scope defined in the claims.

The invention claimed is:

1. An edge-lit backlight module, comprising a rear plate, a light guide plate arranged in the rear plate, an optical film, a reflection sheet, and a position transformation mechanism, wherein the position transformation mechanism is used to interchange the positions of the optical film and the reflection sheet, so that the optical film is located at one of a front surface and a back surface of the light guide plate, and the reflection sheet is located at the other one of the front surface and the back surface of the light guide plate, wherein the position transformation mechanism comprises a roller assembly connecting to the rear plate, and the two ends of the optical film and the two ends of the reflection sheet are respectively connected with each other permanently, so as to form a transmission sleeve which wraps around the roller assembly, and wherein the roller assembly comprises a supporting element, a supporting shaft, and a bearing, wherein the supporting element is arranged fixedly on the rear plate, and is provided with a round hole at an edge of a side thereof away from the light guide plate, and a groove in a direction perpendicular to an axial direction of the round hole, wherein the supporting shaft is arranged in the round hole, and wherein the bearing is arranged in the groove, and is fixed on the supporting shaft.

2. The backlight module according to claim 1, wherein provided is a plurality of bearings, and the number of the grooves equals to that of the bearings, and the width of the grooves matches that of the bearings.

3. The backlight module according to claim 1, wherein the bearings each are provided with a flexible material on a circumferential outer wall thereof.

4. The backlight module according to claim 1, wherein the transmission sleeve is provided with the roller assembly symmetrically on both sides thereof.

5. The backlight module according to claim 1, further comprising a light source provided on a light entering side of the light guide plate, wherein the roller assembly and the light source are arranged away from the light guide plate in sequence, and an adjusting wheel assembly for adjusting position of the transmission sleeve is arranged at a side of the back surface of the light guide plate.

6. The backlight module according to claim 1, wherein the rear plate is structured as a frame, and a glass plate is provided between the rear plate and the light guide plate.

7. The backlight module according to claim 6, wherein a reflection shelf is arranged on a side of the back surface of the rear plate.

8. A liquid crystal display device, comprising: an edge-lit backlight module comprising a rear plate, a light guide plate arranged in the rear plate, an optical film, a reflection sheet, and a position transformation mechanism, wherein the position transformation mechanism is used to interchange the positions of the optical film and the reflection sheet, so that the optical film is located at one of a front surface and a back surface of the light guide plate, and the reflection sheet is located at the other one of the front surface and the back surface of the light guide plate, wherein the position transformation mechanism comprises a roller assembly connecting to the rear plate, and the two ends of the optical film and the two ends of the reflection sheet are respectively connected with each other permanently, so as to form a transmission sleeve which wraps around the roller assembly, and wherein the roller assembly comprises a supporting element, a supporting shaft, and a bearing, wherein the supporting element is arranged fixedly on the rear plate, and is provided with a round hole at an edge of a side thereof away from the light guide plate, and a groove in a direction perpendicular to an axial direction of the round hole, wherein the supporting shaft is arranged in the round hole, and wherein the bearing is arranged in the groove, and is fixed on the supporting shaft.

9. The liquid crystal display device according to claim 8, wherein provided is a plurality of bearings, and the number of the grooves equals to that of the bearings, and the width of the grooves matches that of the bearings.

10. The liquid crystal display device according to claim 8, wherein the bearings each are provided with a flexible material on a circumferential outer wall thereof.

11. The liquid crystal display device according to claim 8, wherein the transmission sleeve is provided with the roller assembly symmetrically on both sides thereof.

12. The liquid crystal display device according to claim 8, further comprising a light source provided on a light entering side of the light guide plate, wherein the roller assembly and the light source are arranged away from the light guide plate in sequence, and an adjusting wheel assembly for adjusting position of the transmission sleeve is arranged at a side of the back surface of the light guide plate.

13. The liquid crystal display device according to claim 8, wherein the rear plate is structured as a frame, and a glass plate is provided between the rear plate and the light guide plate.

14. The liquid crystal display device according to claim 13, wherein a reflection shelf is arranged on a side of the back surface of the rear plate.

* * * * *